US012078320B1

(12) United States Patent
Peng et al.

(10) Patent No.: US 12,078,320 B1
(45) Date of Patent: Sep. 3, 2024

(54) STAGE LIGHT FIXTURE WITH HIGH-STABLE ROTATIONAL POSITIONING

(71) Applicant: Guangzhou Haoyang Electronic Co., Ltd., Guangzhou (CN)

(72) Inventors: Yingru Peng, Guangzhou (CN); Weikai Jiang, Guangzhou (CN); Xianwen Mai, Guangzhou (CN); Wenfeng Chen, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 0 days.

(21) Appl. No.: 18/522,934

(22) Filed: Nov. 29, 2023

(30) Foreign Application Priority Data

Jul. 31, 2023 (CN) .......................... 202322032751.9

(51) Int. Cl.
| | |
|---|---|
| F21V 14/02 | (2006.01) |
| F21V 21/06 | (2006.01) |
| F21V 21/108 | (2006.01) |
| F21V 23/00 | (2015.01) |
| H02K 1/18 | (2006.01) |
| H02K 1/22 | (2006.01) |
| F21W 131/406 | (2006.01) |

(52) U.S. Cl.
CPC .............. *F21V 14/02* (2013.01); *F21V 21/06* (2013.01); *F21V 21/108* (2013.01); *F21V 23/009* (2013.01); *H02K 1/18* (2013.01); *H02K 1/223* (2013.01); *F21W 2131/406* (2013.01)

(58) Field of Classification Search
CPC ......... F21V 21/06; F21V 21/108; H02K 1/18; H02K 1/223
See application file for complete search history.

(56) References Cited

U.S. PATENT DOCUMENTS

| | | | |
|---|---|---|---|
| 11,946,624 B1 * | 4/2024 | Jiang ...................... F21V 21/30 |
| 2005/0174791 A1 * | 8/2005 | Bynum .................... B60Q 3/82 | 362/490 |
| 2011/0222301 A1 * | 9/2011 | Knoedgen .............. B60Q 1/122 | 362/277 |
| 2021/0010648 A1 * | 1/2021 | Jiang ...................... F21V 15/00 |

* cited by examiner

*Primary Examiner* — Evan P Dzierzynski
(74) *Attorney, Agent, or Firm* — MUNCY, GEISSLER, OLDS & LOWE, P.C.

(57) ABSTRACT

A stage light fixture with high-stable rotational positioning including a base, a pivoting arm pivoted to the base through a pivoting shaft, and a light head pivoted to the pivoting arm through another pivoting shaft. An angular detector for detecting a rotation angle of the light head and/or the pivoting arm is further provided, which includes a stator assembly and a rotor assembly oppositely arranged each other, wherein the stator assembly has a magnet exciting coil adapted to form an alternating magnetic field in a region of the stator assembly by high-frequency periodic alternating current and voltage and a receiving coil arranged in the alternating magnetic field adapted to form an induced electromotive force; and the rotor assembly is configured to change electromagnetic coupling strength between the magnet exciting coil and the receiving coil during rotation thereof relative to the stator assembly.

14 Claims, 5 Drawing Sheets

STAGE LIGHT FIXTURE WITH HIGH-STABLE ROTATIONAL POSITIONING

CROSS REFERENCE TO RELATED APPLICATIONS

The present application claims priorities from Chinese Application No. CN 202322032751.9 filed on Jul. 31, 2023, all of which are hereby incorporated herein by reference.

TECHNICAL FIELD

The present invention relates to the technical field of stage light fixtures, and more particularly, relates to a stage light fixture with high-stable rotational positioning.

BACKGROUND

As an illuminating device projected from long distance, the stage light fixture often requires high accuracy of rotational positioning for the light head and pivoting arm. There are currently two kinds of rotational positioning devices including a photoelectric encoder and a magnetic encoder. However, the photoelectric encoder is susceptible to interference from the intense light in the stage light fixture, which may cause positioning error, and the magnetic field intensity of the magnetic encoder may have rapid attenuation under high temperature inside the stage light fixture, as a result of constantly reduced accuracy of positioning. In addition, the photoelectric encoder and the magnetic encoder both intrinsically have relative low accuracy of positioning. Inaccurate positioning may finally render the light spots prone to significant deviation from the target object and thus brings adverse experience for the audiences.

SUMMARY

It is therefore desirable to provide a stage light fixture with high-stable rotational positioning in the present invention, which has an angular detector with less interference from the environment used and thus has relative high accuracy of positioning.

According to the present invention, a stage light fixture with high-stable rotational positioning includes a light head, pivoting arm, and a base. The light head is pivoted to the pivoting arm through a pivoting shaft and the pivoting arm is pivoted to the base through another pivoting shaft, so that the light beams emitted from the light head can be projected in different angles via rotation of the light head and the pivoting arm respectively driven by a motor. An angular detector is further included for detecting the rotation angle of the light head and/or the pivoting arm. The angular detector in the present invention includes a stator assembly and a rotor assembly. The stator assembly has a magnet exciting coil which is adapted to form an alternating magnetic field in the region of the stator assembly by high-frequency periodic alternating current and voltage and a receiving coil arranged in the alternating magnetic field which is adapted to form an induced electromotive force. The rotor assembly is configured to change electromagnetic coupling strength between the magnet exciting coil and the receiving coil.

In the present invention, the rotation angle of the light head and/or the pivoting arm of the stage light fixture is detected by an angular detector including a stator assembly and a rotor assembly, wherein the stator assembly has a magnet exciting coil for generating high-frequency periodic alternating current and voltage and a receiving coil arranged in the alternating magnetic field for generating an induced electromotive force. As the rotor assembly periodically changes electromagnetic coupling strength between the magnet exciting coil and the receiving coil during rotation relative to the stator assembly, the relative rotation angle between the stator assembly and the rotor can be determined according to the signal of induced electromotive force generated by the receiving coil. Such method by using the induced electromotive force to determine the rotation angle has advantages of insusceptible to interference from outside environment and the angular detector having stable working state as the magnet exciting coil has continuous input energy and thus forms unattenuated magnetic field.

Particularly, the rotor assembly may be arranged on the pivoting shaft according to an embodiment of the present invention. In this case, the rotation angle of the light head relative to the pivoting arm or the rotation angle of the pivoting arm relative to the base can be directly determined, as the determination result of the angular detector directly indicates corresponding rotation angle.

Additionally or alternatively, the rotor assembly may be arranged on the drive shaft of the motor according to another embodiment of the present invention. In this case, the rotation angle of the light head relative to the pivoting arm or the rotation angle of the pivoting arm relative to the base can be indirectly determined according to transmission relationship, by measuring the rotation angle of the drive shaft of the motor.

Furthermore, the drive shaft of the motor is connected with a drive wheel, the pivoting shaft is connected with a driven wheel, and a synchronous belt is connected with the drive wheel and the driven wheel. Enger thus can be transmitted between the motor and the light head or the pivoting arm via the synchronous belt.

Preferably, the pivoting shaft of the light head relative to the pivoting arm is rotated with the light head and the pivoting shaft of the pivoting arm relative to the base is fastened to the base. In this case, the motor driving the light head to rotate and the motor driving the pivoting arm to rotate are both arranged in the pivoting arm.

In particular, the rotor assembly in the present invention has at least one annular sector-shape metal region, through which the electromagnetic coupling strength between the magnet exciting coil and the receiving coil is changed during rotation relative to the stator assembly. With the structurally regular annular sector-shape metal region, the induced current generated by the receiving coil thus can achieve gradual change with more regularity during relative rotation between the magnet exciting coil and the receiving coil, thereby facilitating determination of the rotation angle according to the induced current detected.

In order to achieve that the corresponding rotation period can still be obtained to determine its absolute position regardless of the number of turns the light head and/or the pivoting arm rotates, the receiving coil particularly includes a first receiving ring and a second receiving ring, correspondingly the annular sector-shape metal region includes a first metal region for changing the electromagnetic coupling strength between the magnet exciting coil and the first receiving coil and a second metal region for changing the electromagnetic coupling strength between the magnet exciting coil and the second receiving ring, and the first metal region and the second metal region are configured in such a way that the relative rotation period and rotation angle of the rotor assembly relative to the stator assembly can be determined according to the receiving signals of the first receiving ring and the second receiving ring.

More preferably, the first metal region is formed by at least 20 annular sector-shape metal sheets which are surrounded the center of the rotor assembly at interval. Therefore, with the at least 20 annular sector-shape metal sheets, the electromagnetic coupling strength between the magnet exciting coil and the first receiving ring can be changed at least 20 times during one rotation of the rotor assembly relative to the stator assembly, namely, the first receiving ring may only send at least 20 period signals corresponding to the number of the annular sector-shape metal sheets, which is advantageous to improve the accuracy of the angular detector.

The second metal region is formed by one continuous annular sector-shape metal sheet with the central angle of 180 degrees. Therefore, with the one annular sector-shape metal sheet, the electromagnetic coupling strength between the magnet exciting coil and the second receiving ring can be changed only one time during one rotation of the rotor assembly relative to the stator assembly, namely, the second receiving ring may only send one period signal.

To improve the accuracy of the angular detector, the second mental region is arranged at the inner side of the first mental region close to the center thereof. As more annular sector-shape metal sheets thus can be arranged in the first mental region in such design.

In particular, the magnet exciting coil includes a first magnet exciting ring, a second magnet exciting ring, and a third magnet exciting ring which are concentrically arranged in sequence, the first receiving ring is arranged between the first magnet exciting ring and the second magnet exciting ring, and the second receiving ring is arranged between the second magnet exciting ring and the third magnet exciting ring. Sun configuration can make the energy of the magnetic field generated by the whole magnet exciting coil more balanced, and the signal received by the first receiving ring and the second receiving ring will be more stable.

For making the centers of the stator assembly and the rotor assembly coincided, a positioning bearing may be further included. The outer ring of the positioning bearing is fastened on the driven wheel and the inner ring of the positioning bearing is arranged around the pivoting shaft. In this case, the rotor assembly is arranged on the outer ring of the positioning bearing and the stator assembly is fixed to a positioning post which is inserted the inner ring of the positioning bearing, with the cooperation of the positioning bearing and the positioning post, centers of the stator assembly and the rotor assembly thus can be coincided. In such way, the coincidence degrees of the centers of the stator assembly and the rotor assembly are significantly improved during installation, making the data more accurate and the performance more stable for the angular detector.

Further, in order to render the light effects of the stage light fixture more abundant, at least one optical element is provided in the light head, such as a light forming element, a pattern shaping component, a color rendering component, a focusing lens component, a splitter component, a frosting component, and a magnifying lens component, each of them can generate different light effects.

To make the angular detector powered on to continuously detect the rotation angle of the light head and/or the pivoting arm even if the stage light fixture is powered off, an auxiliary power supply may be further provided which is used for supplying power to the angular detector when the stage light fixture is powered off. Therefore, the angle position of the light head and/or the pivoting arm can be obtained immediately without resetting, when the stage light fixture is re-energized.

DETAILED DESCRIPTION

The accompanying drawings are for exemplary illustration only, and should not be construed as limitations on this invention. In order to better illustrate the present embodiment, some parts of the accompanying drawings may be omitted, enlarged or reduced, and do not represent the size of actual products. For those skilled in the art, it is understandable that certain well-known structures and descriptions thereof may be omitted in the drawings. The positional relationship described in the drawings is only for exemplary illustration, and should not be construed as a limitation on this invention.

Figure 1:
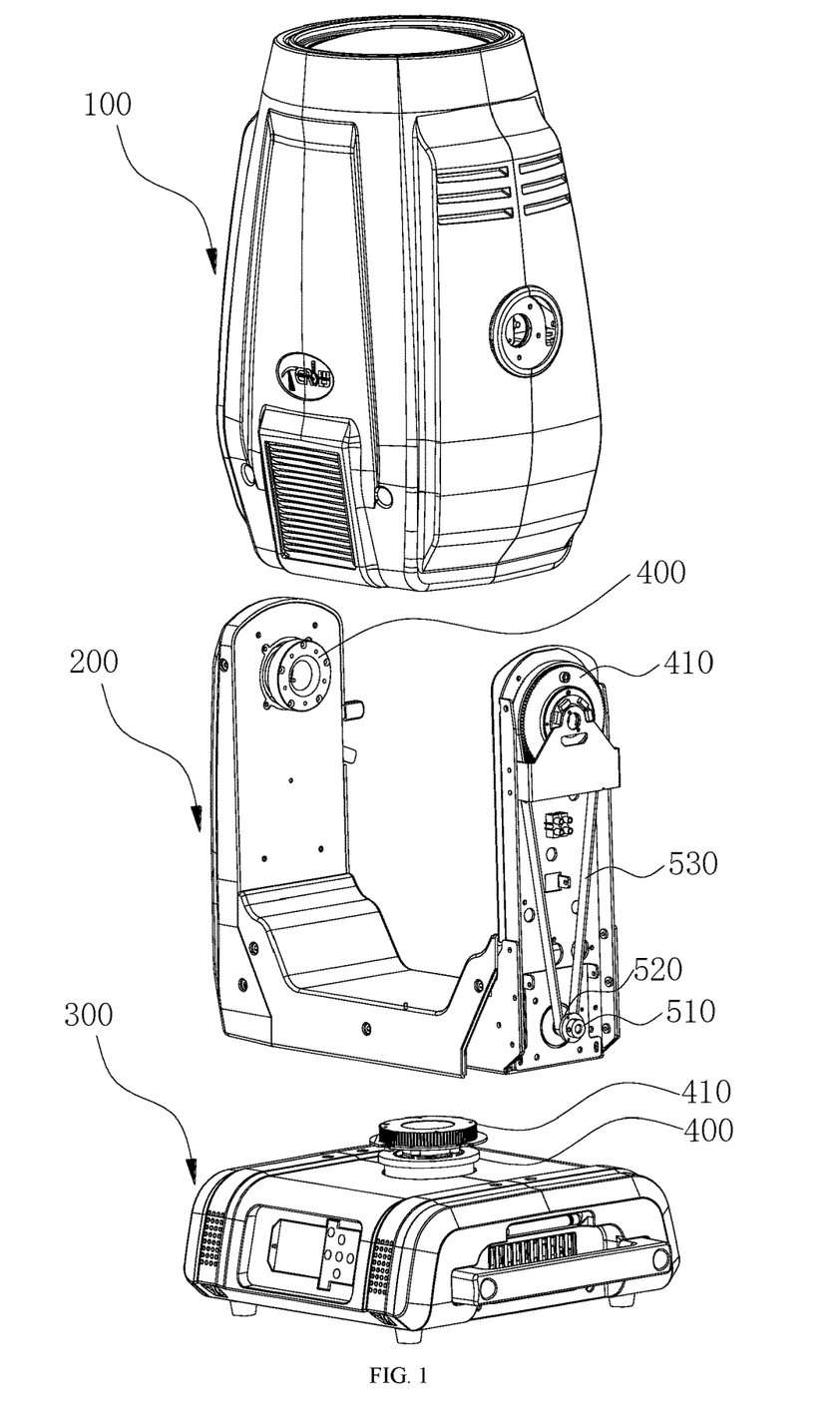
FIG. 1 is an exploded view of a stage light fixture with high-stable rotational positioning according to an embodiment of the present invention.

FIG. 1 depicts a stage light fixture with high-stable rotational positioning, which includes a light head 100, pivoting arm 200 and a base 300. The light head 100 is pivoted to the pivoting arm 200 through a pivoting shaft 400, and the pivoting arm 200 is pivoted to the base 300 through another pivoting shaft 400, so that the light beams emitted from the light head 100 can be projected in different angles via rotation of the light head 100 and the pivoting arm 200 respectively driven by a motor 500. An angular detector 600 is further included for detecting the rotation angle of the light head 100 and/or the pivoting arm 200. The angular detector 600 includes a stator assembly 610 and a rotor assembly 620. In combination with FIGS. 4 and 5, the stator assembly 610 has a magnet exciting coil 611 which is adapted to form an alternating magnetic field in the region of the stator assembly 610 by high-frequency periodic alternating current and voltage and a receiving coil 612 arranged in the alternating magnetic field which is adapted to form an induced electromotive force. The rotor assembly 620 is configured to change electromagnetic coupling strength between the magnet exciting coil 611 and the receiving coil 612.

Figure 4:
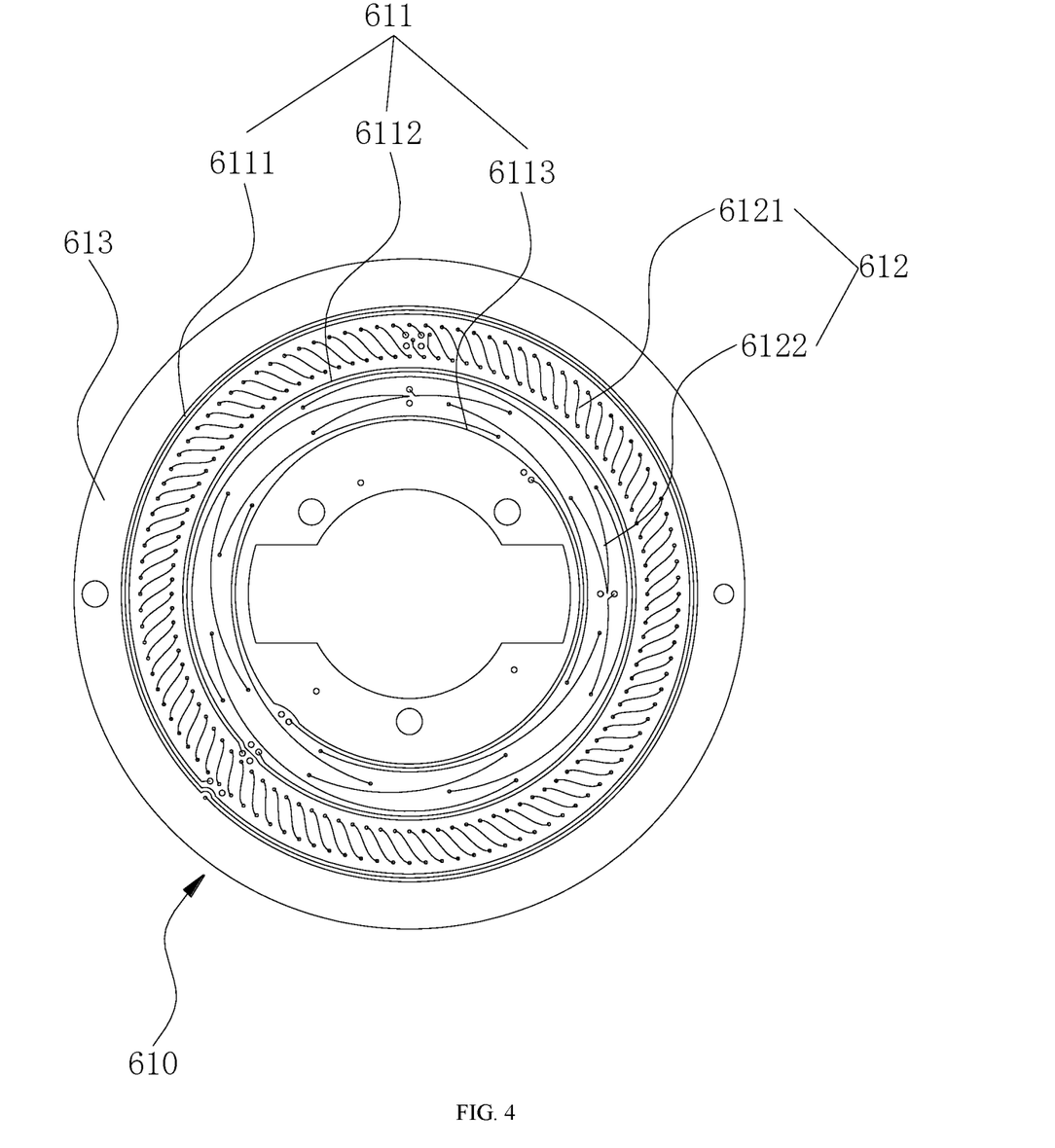
FIG. 4 is a perspective view of a stator assembly according to an embodiment of the present invention.
Figure 5:
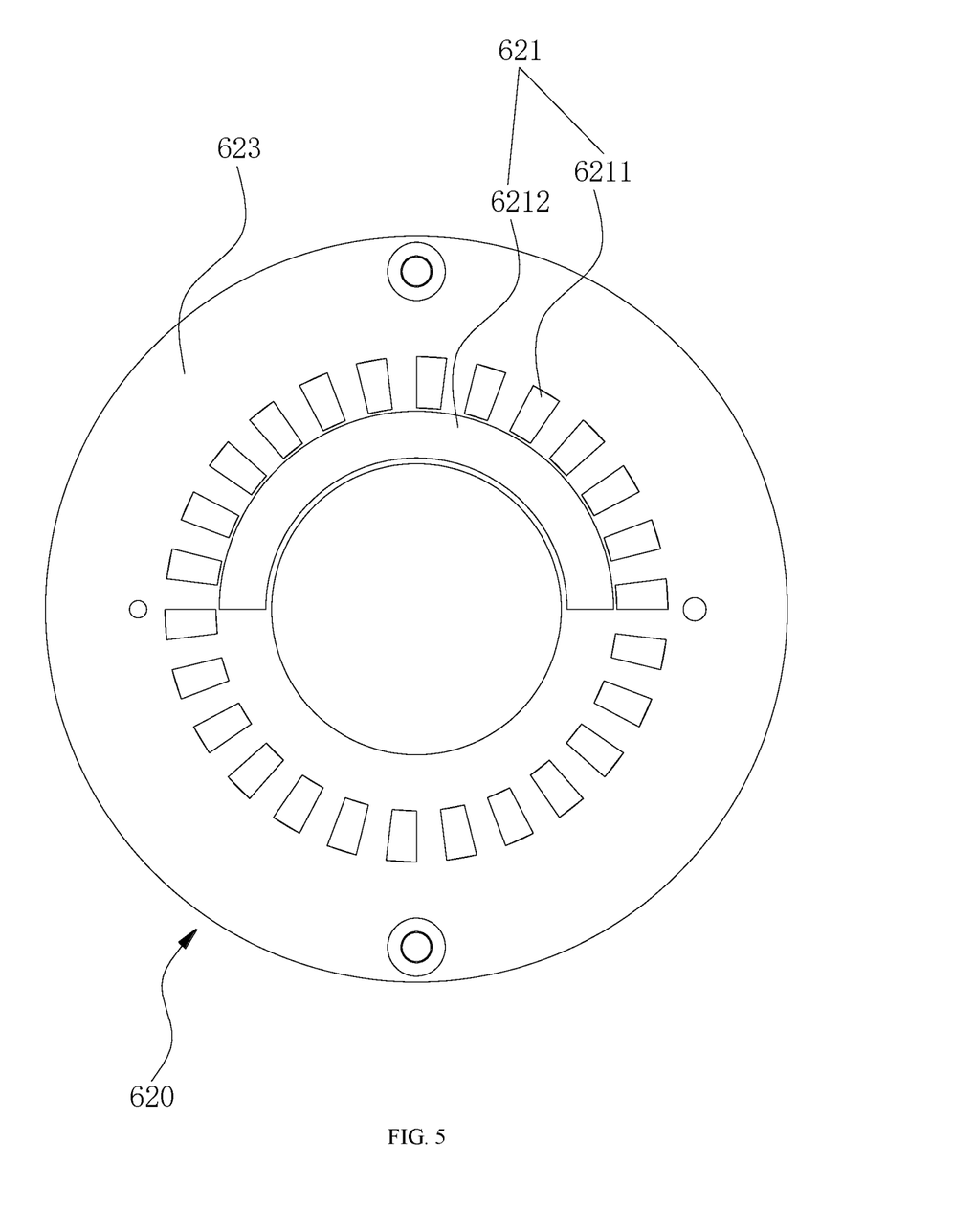
FIG. 5 is perspective view of a rotor assembly according to an embodiment of the present invention.

In the present embodiment, the rotation angle of the light head 100 and/or the pivoting arm 200 of the stage light fixture is detected by an angular detector 600 including a stator assembly 610 and a rotor assembly 620, wherein the stator assembly 610 has a magnet exciting coil 611 for generating high-frequency periodic alternating current and voltage and a receiving coil 612 arranged in the alternating magnetic field for generating an induced electromotive force. In accordance with the Faraday law of electromagnetic induction, with the change of magnetic flux in a closing coil, induced electromotive force forms in the closing coil. Accordingly, the receiving coil 612 in the alternating magnetic field will generate an induced electromotive force. In addition, the rotor assembly 620 periodically changes electromagnetic coupling strength between the magnet exciting coil 611 and the receiving coil 612 during rotation relative to the stator assembly 610, which in turn changes the induced electromotive force generated by the receiving coil 612, therefore, the relative rotation angle between the stator assembly 610 and the rotor 620 can be determined according to the signal of induced electromotive force generated by the receiving coil 612. Such method by using the induced electromotive force to determine the rotation angle thus has advantages of insusceptible to interference from outside environment and the angular detector 600 having stable working state as the magnet exciting coil 611 has continuous input energy and thus forms unattenuated magnetic field.

It should be noted that in the context of the present invention, the stator assembly 610 and the rotor assembly 620 are arranged relative to each other with one rotational and the other one irrotational. That is, it is not limited that the stator assembly 610 is irrotational and the rotor assembly 620 is rotational in the present embodiment, the stator assembly 610 may also be rotational while the rotor 620 is irrotational in other embodiments.

In the present embodiment, an oscillation circuit (not shown in the FIGs.) is further included which is cooperated with the magnet exciting coil 611 to generate high-frequency periodic alternating current and voltage.

As FIG. 4 shown, the stator assembly 610 has a substrate 613, the magnet exciting coil 611 is formed as a plurality of annular coils which are concentrically arranged on the substrate 613, the receiving coil 612 includes one or more than one periodically repetitive specific geometric structure, and such specific geometric structure forms a spiral coil perpendicular to the thickness direction of the substrate 613 which is in response to the alternating magnetic field to generate an induced current. The specific geometric structure may be in horseshoe shape, in similar-sinusoid shape, and in sector shape and the like. It should be noted that more repetitive period the receiving coil 612 has (namely more specific geometric structures), more receiving signals in the angular range detected will be obtained, higher resolution ratio the output signals thus may in turn have, thereby increasing accuracy of the code signal and accelerating the computing speed of the processer.

In an embodiment, the rotor assembly 620 is arranged on the pivoting shaft 400. In such way, the rotation angle of the light head 100 relative to the pivoting arm 200 or the rotation angle of the pivoting arm 200 relative to the base 300 can be directly determined, as the determination result of the angular detector directly indicates corresponding rotation angle.

Alternatively or additionally, the rotor assembly 620 is arranged on the drive shaft 510 of the motor 500. In this way, the rotation angle of the light head 100 relative to the pivoting arm 200 or the rotation angle of the pivoting arm 200 relative to the base 300 can be indirectly determined according to transmission relationship, by measuring the rotation angle of the drive shaft 510 of the motor 500.

In the illustrated embodiment, the rotor assembly 620 of the angular detector 600 for determining the rotation angle of the light head 100 relative to the pivoting arm 200 is fastened to the pivoting shaft 400 of the light head 100, and the rotor assembly 620 of the angular detector 600 for determining the rotation angle of the pivoting arm 200 relative to the base 300 is fastened to the drive shaft 510 of the motor 500.

Figure 2:
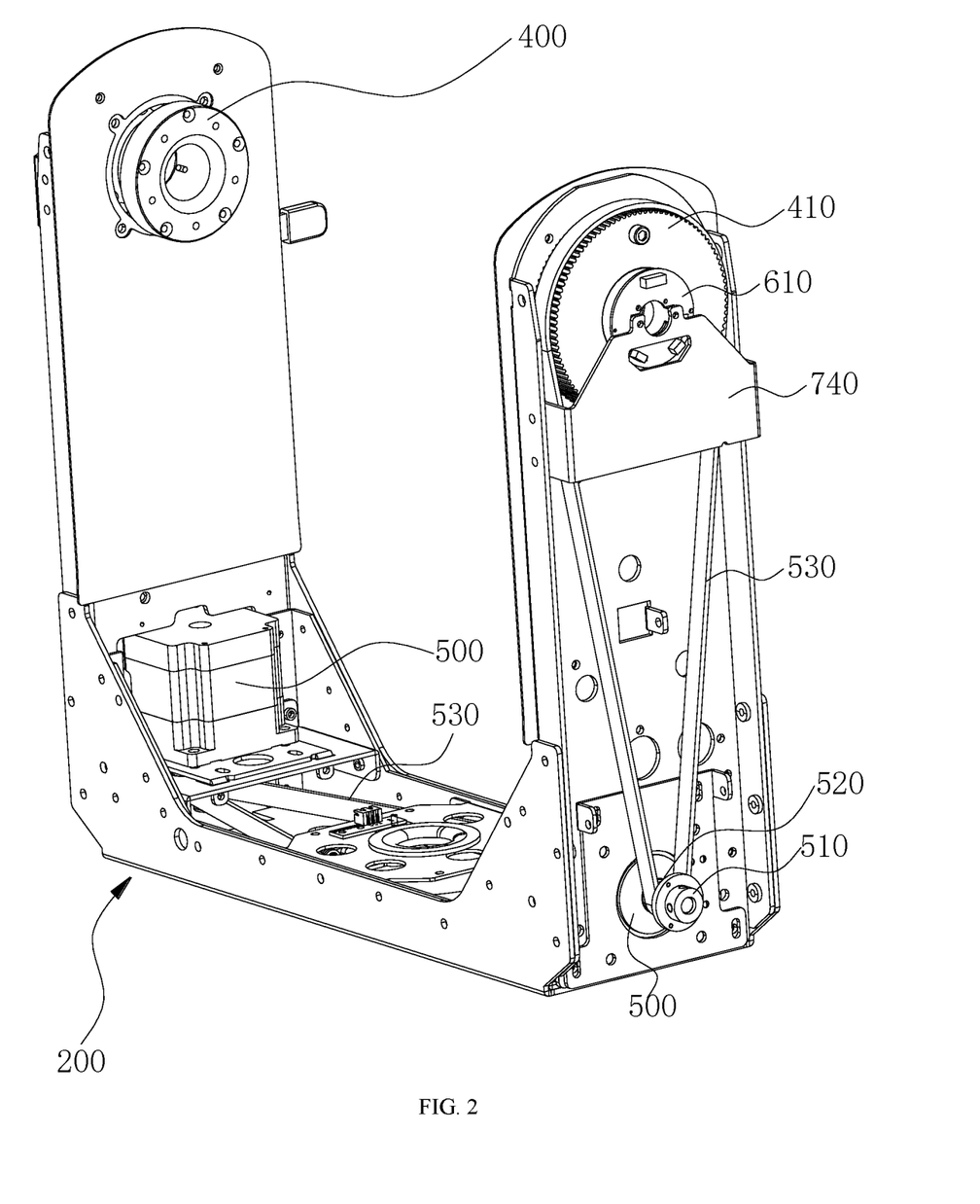
FIG. 2 is a perspective view of a pivoting arm of FIG. 1.

In the illustrated embodiment, the drive shaft 510 of the motor 500 is connected with a drive wheel 520, the pivoting shaft 400 is connected with a driven wheel 410, and a synchronous belt 530 is connected with the drive wheel 520 and the driven wheel 410. Enger thus is transmitted between the motor 500 and the light head 100 or the pivoting arm 200 via the synchronous belt 530. Therefore, in the case that the rotor assembly 620 is arranged on the drive shaft 510 of the motor 500, the rotation angle of the light head 100 relative to the pivoting arm 200 or the rotation angle of the pivoting arm 200 relative to the base 300 can be indirectly determined according to the gear ratio of the drive wheel 520 and the driven wheel 410, by measuring the rotation angle of the drive shaft 510 of the motor 500.

In a preferable embodiment, the pivoting shaft 400 of the light head 100 relative to the pivoting arm 200 is rotated with the light head 100, and the pivoting shaft 400 of the pivoting arm 200 relative to the base 300 is fastened to the base 300 so that the pivoting arm 200 is rotated around the pivoting shaft 400 thereof with the pivoting shaft 400 itself not rotated. In this case, the motor 500 driving the light head 100 to rotate and the motor 500 driving the pivoting arm 200 to rotate are both arranged in the pivoting arm 200.

Figure 3:
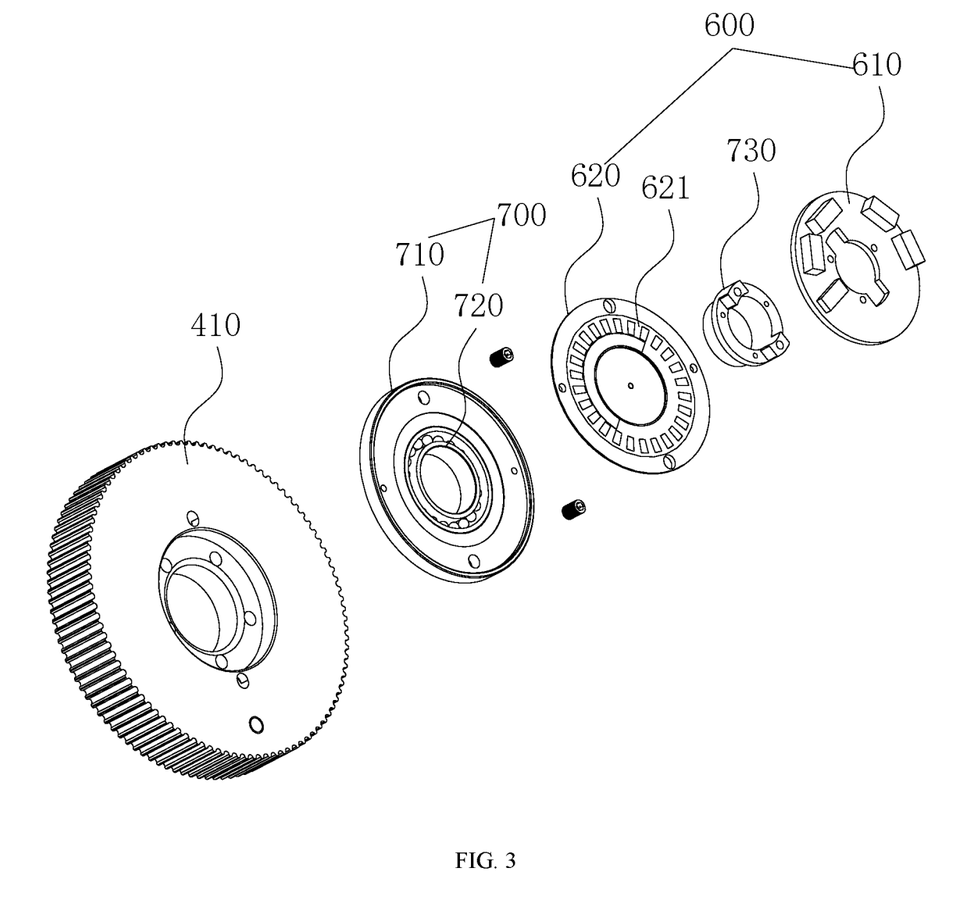
FIG. 3 is an exploded view showing assembly of an angular detector and a positioning bearing.

In this case, as FIG. 3 shown, the rotor assembly 620 of the angular detector 600 for determining rotation angle of the light head 100 is fastened on the driven wheel 410 which is connected with the pivoting shaft 400. Therefore, the rotor assembly 620 for the light head 100 can achieve rotation with the light head 100.

In combination with FIG. 4 and FIG. 5, the rotor assembly 620 has at least one annular sector-shape metal region 621, through which the electromagnetic coupling strength between the magnet exciting coil 611 and the receiving coil 612 can be changed during rotation relative to the stator assembly 610. With the structurally regular annular sector-shape metal region 621, the induced current generated by the receiving coil 612 thus can achieve gradual change with more regularity during relative rotation between the magnet exciting coil 611 and the receiving coil 612, facilitating determination of the rotation angle according to the induced current detected.

Specifically, the annular sector-shape metal region 621 may be integrally formed as a piece of complete and continuous metal sheet, and may also be formed by a plurality of metal wires.

In the illustrated embodiment, the rotor assembly 620 has a base plate 623 and the stator assembly 610 has a base plate 613, both base plates are made of non-electromagnetic induction materials, the magnet exciting coil 611, the receiving coil 612 and the annular sector-shape metal region 621 are each arranged on the corresponding base plate.

In the illustrated embodiment, the receiving coil 612 particularly includes a first receiving ring 6121 and a second receiving ring 6122, correspondingly the annular sector-shape metal region 621 includes a first metal region 6211 for changing the electromagnetic coupling strength between the magnet exciting coil 611 and the first receiving ring 612 and a second metal region 6212 for changing the electromagnetic coupling strength between the magnet exciting coil 611 and the second receiving ring 6122, and the first metal region 6211 and the second metal region 6212 are configured in such a way that the relative rotation period and rotation angle between the rotor assembly 620 and the stator assembly 610 can be determined according to the receiving signals of the first receiving ring 6121 and the second receiving ring 6122. In such a way, regardless of the number of turns the light head 100 and/or the pivoting arm 200 rotates, the corresponding rotation period can still be obtained, thereby determining its absolute position.

In order to conveniently detect signals and conduct calculation, the annular sector-shape metal region 621 preferably has same geometric structure and repetitive period with the receiving coil 612. However, the annular sector-shape metal region 621 and the receiving coil 612 may have different geometric structure and repetitive period in actual applications.

Particularly, the first receiving ring 6121 and the second receiving ring 6122 each has two winding coils with a certain phase difference, preferably 90 degrees phase difference.

Preferably, the first metal region 6211 is formed by at least 20 annular sector-shape metal sheets which are surrounded the center of the base plate 623 of the rotor assembly 620 at interval. Therefore, with the at least 20 annular sector-shape metal sheets, the electromagnetic coupling strength between the magnet exciting coil 611 and the first receiving ring 6121 can be changed at least 20 times during one rotation of the rotor assembly 620 relative to the stator assembly 610, namely, the first receiving ring 6121 may only send at least 20 period signals corresponding to the number of the annular sector-shape metal sheets, which is advantageous to improve the accuracy of the angular detector.

In the illustrated embodiment, the first receiving ring 6121 is formed by 52 metal sires in similar-sinusoid shape which are sequentially wound along the circumference direction and the first metal region 6211 is formed by 26 annular sector-shape metal sheets which are surrounded the center of the base plate 623 of the rotor assembly 620 at interval.

In the illustrated embodiment, the second metal region 6212 is formed by one continuous annular sector-shape metal sheet with the central angle of 180 degrees. Therefore, with the one annular sector-shape metal sheet, the electromagnetic coupling strength between the magnet exciting coil 611 and the second receiving ring 6122 can be changed only one time during one rotation of the rotor assembly 620 relative to the stator assembly 610, namely, the second receiving ring 6122 may only send one period signal.

The second mental region 6212 is preferably arranged at the inner side of the first mental region 6211 close to the center thereof. In such configuration, more annular sector-shape metal sheets thus can be arranged in the first mental region 6211 to improve the accuracy of the angular detector.

In the illustrated embodiment, the magnet exciting coil 611 includes a first magnet exciting ring 6111, a second magnet exciting ring 6112 and a third magnet exciting ring 6113 which are concentrically arranged in sequence, the first receiving ring 6121 is arranged between the first magnet exciting ring 6111 and the second magnet exciting ring 6112, and the second receiving ring 6122 is arranged between the second magnet exciting ring 6112 and the third magnet exciting ring 6113. Sun configuration makes the energy of the magnetic field generated by the whole magnet exciting coil 611 more balanced, and the signal received by the first receiving ring 6121 and the second receiving ring 6122 will be more stable.

Referring to FIG. 2 and FIG. 3, a positioning bearing 700 is further included. The outer ring 710 of the positioning bearing 700 is fastened on the driven wheel 410 and the inner ring 720 of the positioning bearing 700 is arranged around the pivoting shaft 400. In this case, the rotor assembly 620 is arranged on the outer ring 710 of the positioning bearing 700 and the stator assembly 610 is fixed to a positioning post 730 which is inserted the inner ring 720 of the positioning bearing 700, with the cooperation of the positioning bearing 700 and the positioning post 730, centers of the stator assembly 610 and the rotor assembly 620 thus can be coincided. In such way, the coincidence degrees of the centers of the stator assembly 610 and the rotor assembly 620 is significantly improved during installation, making the data more accurate and the performance more stable for the angular detector.

As shown, for the angular detector 600 of the light head 100, the positioning post 730 and the stator assembly are fastened to a bracket 740 arranged on the pivoting arm 200.

In order to render the light effects of the stage light fixture more abundant, at least one optical element is provided in the light head 100, such as a light forming element, a pattern shaping component, a color rendering component, a focusing lens component, a splitter component, a frosting component, and a magnifying lens component, each of them can generate different light effects.

According to a preferable embodiment, an auxiliary power supply (not shown in the drawing) is further provided which is used for supplying power to the angular detector 600 when the stage light fixture is powered off. With such auxiliary power supply, even if the stage light fixture is powered off, the angular detector 600 can be powered on to continuously detect the rotation angle of the light head 100 and/or the pivoting arm 200. As a result, the angle position of the light head 100 and/or the pivoting arm 200 can be obtained immediately without resetting, when the stage light fixture is re-energized.

Obviously, the above-mentioned embodiments of the present invention are only examples for clearly illustrating the present invention, rather than limiting the mode of implementation of the present invention. For those of ordinary skill in the art, changes or alterations in other different forms can also be made on the basis of the above description. It is not needed and also not possible to list all the modes of implementation here. Any modification, equivalent replacement, improvement, etc. made within the spirit and principle of the present invention shall be included within the protection scope of the claims of the present invention.

What is claimed is:

1. A stage light fixture with high-stable rotational positioning, comprising:
    a base;
    a pivoting arm pivoted to the base through a pivoting shaft; and
    a light head pivoted to the pivoting arm through another pivoting shaft,
    wherein light beams emitted from the light head are projected in different angles via rotation of the light head and the pivoting arm respectively driven by a motor,
    further comprising an angular detector for detecting a rotation angle of the light head and/or the pivoting arm, which includes
        a stator assembly having a magnet exciting coil which is adapted to form an alternating magnetic field in a region of the stator assembly by high-frequency periodic alternating current and voltage and a receiving coil arranged in the alternating magnetic field which is adapted to form an induced electromotive force; and
        a rotor assembly which is configured to change electromagnetic coupling strength between the magnet exciting coil and the receiving coil during rotation thereof relative to the stator assembly.

2. The stage light fixture with high-stable rotational positioning according to claim 1, wherein the rotor assembly is arranged on the pivoting shaft.

3. The stage light fixture with high-stable rotational positioning according to claim 1, wherein the rotor assembly is arranged on a drive shaft of the motor.

4. The stage light fixture with high-stable rotational positioning according to claim 1, wherein a drive shaft of the motor is connected with a drive wheel, the pivoting shaft is connected with a driven wheel, and a synchronous belt is connected with the drive wheel and the driven wheel.

5. The stage light fixture with high-stable rotational positioning according to claim 1, wherein the pivoting shaft of the light head relative to the pivoting arm is capable of rotating with the light head and the pivoting shaft of the pivoting arm relative to the base is fastened to the base.

6. The stage light fixture with high-stable rotational positioning according to claim 1, wherein the rotor assembly has at least one annular sector-shape metal region, through which the electromagnetic coupling strength between the magnet exciting coil and the receiving coil is changed during rotation relative to the stator assembly.

7. The stage light fixture with high-stable rotational positioning according to claim 6, wherein the receiving coil includes a first receiving ring and a second receiving ring, the annular sector-shape metal region correspondingly includes a first metal region for changing the electromagnetic coupling strength between the magnet exciting coil and the first receiving ring and a second metal region for changing the electromagnetic coupling strength between the magnet exciting coil and the second receiving ring, and the first metal region and the second metal region are configured in such a way that a relative rotation period and rotation angle of the rotor assembly relative to the stator assembly can be determined according to receiving signals of the first receiving ring and the second receiving ring.

8. The stage light fixture with high-stable rotational positioning according to claim 7, wherein the first metal region is formed by at least 20 annular sector-shape metal sheets which are surrounded a center of the rotor assembly at interval.

9. The stage light fixture with high-stable rotational positioning according to claim 7, wherein the second metal region is formed by one continuous annular sector-shape metal sheet with a central angle of 180 degrees.

10. The stage light fixture with high-stable rotational positioning according to claim 9, wherein the second mental region is arranged at an inner side of the first mental region close to a center thereof.

11. The stage light fixture with high-stable rotational positioning according to claim 7, wherein the magnet exciting coil includes a first magnet exciting ring, a second magnet exciting ring, and a third magnet exciting ring which are concentrically arranged in sequence, the first receiving ring is arranged between the first magnet exciting ring and the second magnet exciting ring, and the second receiving ring is arranged between the second magnet exciting ring and the third magnet exciting ring.

12. The stage light fixture with high-stable rotational positioning according to claim 1, wherein a rotor assembly is arranged on an outer ring of a positioning bearing and a stator assembly is fixed to a positioning post which is inserted an inner ring of the positioning bearing, with cooperation of the inner ring of the positioning bearing and the positioning post, centers of the stator assembly and the rotor assembly keeps coincided.

13. The stage light fixture with high-stable rotational positioning according to claim 1, wherein at least one optical element is provided in the light head, including a light forming element, a pattern shaping component, a color rendering component, a focusing lens component, a splitter component, a frosting component, and a magnifying lens component.

14. The stage light fixture with high-stable rotational positioning according to claim 1, wherein an auxiliary power supply is further provided for supplying power to the angular detector when the stage light fixture is powered off.

* * * * *